(12) United States Patent
Johansen et al.

(10) Patent No.: US 7,818,103 B2
(45) Date of Patent: Oct. 19, 2010

(54) TEST METHOD AND SYSTEM FOR DYNAMIC POSITIONING SYSTEMS

(75) Inventors: Tor Arne Johansen, Vikhamar (NO); Asgeir Johan Sørensen, Flatåsen (NO); Roger Skjetne, Ranheim (NO)

(73) Assignee: Marine Cybernetics AS, Trondheim (NO)

( * ) Notice: Subject to any disclaimer, the term of this patent is extended or adjusted under 35 U.S.C. 154(b) by 1515 days.

(21) Appl. No.: 11/097,382

(22) Filed: Apr. 4, 2005

(65) Prior Publication Data
US 2006/0111855 A1    May 25, 2006

(30) Foreign Application Priority Data
Nov. 19, 2004    (NO) .................................. 20045039

(51) Int. Cl.
*B60L 9/00*    (2006.01)
*G01C 21/00*    (2006.01)
(52) U.S. Cl. ......................... 701/22; 701/224; 702/67
(58) Field of Classification Search ............... 702/67; 701/21, 224
See application file for complete search history.

(56) References Cited

U.S. PATENT DOCUMENTS

| | | | |
|---|---|---|---|
| 3,148,653 A * | 9/1964 | Shatto, Jr. et al. ........ | 114/144 B |
| 3,576,977 A * | 5/1971 | Kolb ........................... | 701/224 |
| 3,715,571 A * | 2/1973 | Braddon ..................... | 701/21 |
| 3,844,242 A * | 10/1974 | Sernatinger et al. ..... | 114/144 B |
| 4,301,760 A | 11/1981 | Cassone et al. | |
| 4,769,773 A * | 9/1988 | Shatto, Jr. .................... | 701/21 |
| 5,023,791 A | 6/1991 | Herzberg et al. | |
| 5,214,582 A | 5/1993 | Gray | |
| 5,260,874 A | 11/1993 | Berner et al. | |
| 5,317,542 A | 5/1994 | Konopelski | |
| 5,523,951 A | 6/1996 | Kriesgman et al. | |
| 5,541,863 A | 7/1996 | Magor et al. | |

(Continued)

FOREIGN PATENT DOCUMENTS

EP    1168121 A2    1/2002

(Continued)

OTHER PUBLICATIONS

International Preliminary Report on Patentability, PCT/NO 2003/000445 (corresponding to WO 2004/059411), Apr. 12, 2005.

(Continued)

*Primary Examiner*—Khoi Tran
*Assistant Examiner*—Ian Jen
(74) *Attorney, Agent, or Firm*—Rothwell, Figg, Ernst & Manbeck, PC

(57) ABSTRACT

A test system and method for a marine vessel dynamic positioning system comprising a control system (2) arranged for receiving real measurement signals (7) from sensors (8) and for output of control signals (13) to actuators (16, 17, 18). The test system comprises a signal modifying computer (80) arranged for receiving real measurement signals (7), modifying the real measurement signals (7) into modified measurement signals (70) that depend on real values of the real measurement signals (7), and sending the modified measurement signals (70) to the control system (2), wherein the modified measurement signals (70) replaces the real measurement signals (7), so as for enabling testing of the control system (2) on errors represented by the modified measurement signals (70).

16 Claims, 3 Drawing Sheets

U.S. PATENT DOCUMENTS

Figure 1:
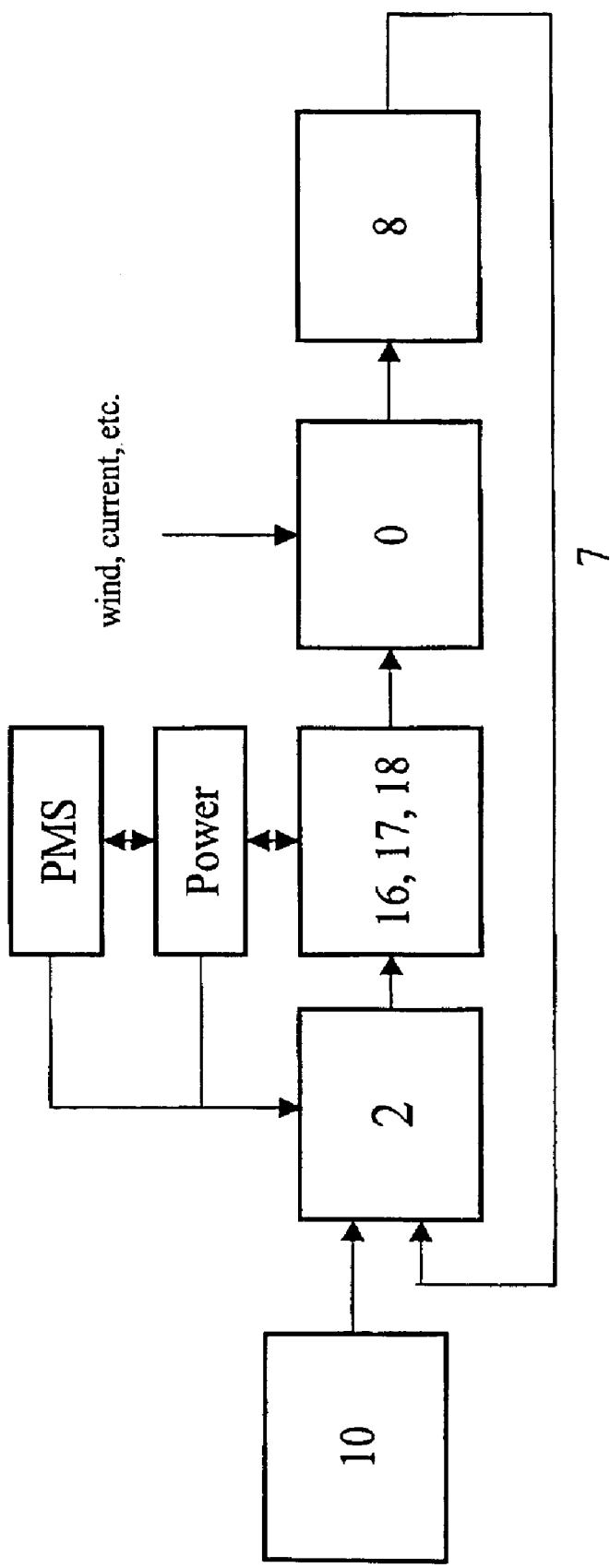

| | | | |
|---|---|---|---|
| 6,298,318 B1 | 10/2001 | Lin | |
| 6,450,112 B1 | 9/2002 | Deghuee | |
| 6,474,252 B1 * | 11/2002 | Delago | 114/230.12 |
| 6,505,574 B1 | 1/2003 | Naud et al. | |
| 6,799,528 B1 * | 10/2004 | Bekker | 114/151 |
| 6,848,382 B1 * | 2/2005 | Bekker | 114/144 B |
| 2003/0079668 A1 * | 5/2003 | Morvillo | 114/151 |
| 2003/0139916 A1 | 7/2003 | Choe et al. | |

FOREIGN PATENT DOCUMENTS

| | | |
|---|---|---|
| NO | 20026284 | 6/2004 |
| NO | 318712 B1 | 7/2004 |
| NO | 20035861 | 7/2004 |
| SU | 508713 A | 5/1976 |
| SU | 708312 A | 1/1980 |
| SU | 1298781 A | 3/1987 |
| WO | WO 92/14216 A1 | 8/1992 |
| WO | WO 03/093913 A1 | 11/2003 |
| WO | WO 2004/059411 A1 | 7/2004 |

OTHER PUBLICATIONS

Written Opinion in PCT/NO 2003/00445 (corresponding to WO 2004/059411), Sep. 24, 2004.
Office Action in NO 20035861, Aug. 3, 2004.
Office Action in NO 20042415, Jan. 12, 2005.
Office Action in NO 20045039 (priority application of present application), May 19, 2005.
International Search Report and Written Opinion PCT/NO 2005/00138, Sep. 9, 2005.
International Search Report and Written Opinion, PCT/NO2005/000122, Sep. 19, 2005.
Office Action in NO 20026284.

* cited by examiner

Figure 1, prior art

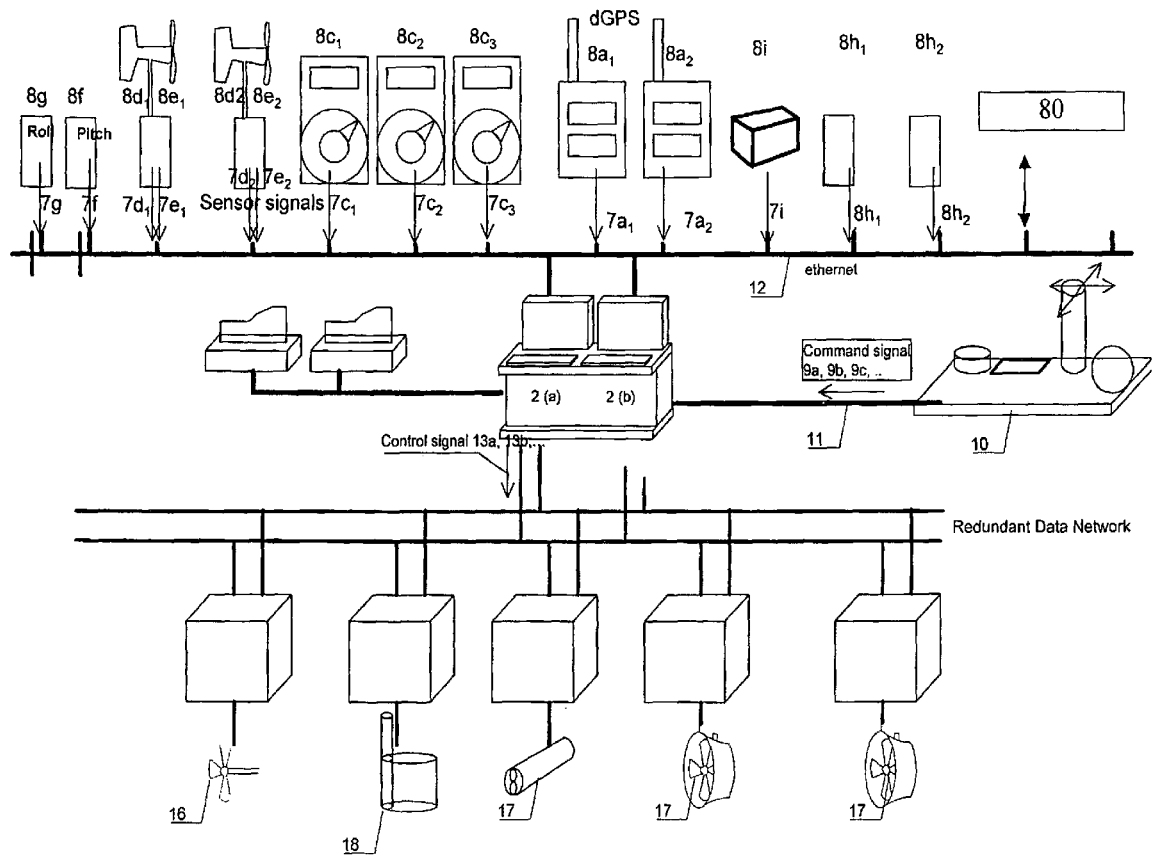
Fig. 3, system with signal modifying computer (80)

TEST METHOD AND SYSTEM FOR DYNAMIC POSITIONING SYSTEMS

INTRODUCTION

Dynamic positioning (DP) systems for vessels are used for so-called station keeping in which the vessel shall automatically maintain a fixed position or a predetermined track at sea without the use of anchors or in combination with anchors. It is important to have a test system and a test method to facilitate extensive testing of a dynamic positioning system to verify that the dynamic positioning system is capable of achieving safe and accurate positioning of the vessel. The need for extensive testing is due to the fact that the successful operation of the dynamic positioning system is critical for the safety of the vessel, other vessels and structures, and the environment and completion of its mission while under dynamic positioning control. A dynamic positioning system is a complicated technical system comprising a computer system, a computer network, many sensors, thrusters and actuators, machinery, a power system and marine automation system. It is important that the testing covers effects related to the interaction of the main components of the dynamic positioning system including the computer control systems, the computer network, the power system, machinery, the power buses, the thrusters, the position reference systems, and the actuators. Prior art does not allow for the required extensive testing of these effects, and this motivates the presents invention being a new system and method for the testing of dynamic positioning.

Prior Art

The prior art comprises the international patent application WO9214216 which is discussed below. Further, several US patents describe methods and devices for positioning of vessels.

U.S. Pat. No. 4,301,760 from 1981 describes a method for positioning a drilling ship over a deep sea well. U.S. Pat. No. 5,023,791 relates to an automated test apparatus for testing the flight controls system of an aircraft. U.S. Pat. No. 5,523,951 from 1996 describes a system for automatic ship steering along a desired ground track. U.S. Pat. No. 5,260,874 describes an aircraft test system that generates stimuli that emulate the stimuli received by an aircraft when in flight, i.e. the aircraft must be grounded. U.S. Pat. No. 5,541,863 describes a virtual integrated software testbed for avionics. U.S. Pat. No. 6,298,318 relates to a real-time inertial movement signal emulation. U.S. Pat. No. 6,450,112 claims a method for automatic positioning of a vessel including a command source for input of desired vessel position or rate to control laws, for determining a force or moment required

Components of a Dynamic Positioning System

A dynamic positioning (DP) system may comprise:
1. A dynamic positioning computer system including the DP computers, data input/output system and DP software;
2. A computer network;
3. A power system including the machinery, power generator, a power management system (PMS), the power buses and switchboards, uninterruptible power supplies (UPS), and low and high voltage distribution, including auxiliary equipment such as marine automation, fuel pumps, cooling and circulation pumps etc.;
4. Propulsion in the form of thrusters and rudders, including local thruster control systems and auxiliary systems for hydraulics, cooling, marine automation etc.;
5. A measurement system in the form of position reference systems and sensors.
6. An operator station where information is presented to an operator on displays and where there are input command (10) devices that the operators may input commands to the DP system.

Hardware-in-the-Loop Simulation

The DP Control System is tested, according to prior art, with hardware-in-the-loop simulation in which the DP Control System is connected to a simulator instead of the vessel. The simulator inputs the thruster and rudder commands from DP Computer System, and calculates the vessel motion that would have resulted with such thruster and rudder commands. The simulator returns the signals that would have resulted from the measurement system for the motion calculated by the simulator. Seen from the DP Control System it appears that it is connected to the equipment installed on the vessel, while it is actually connected to the simulator. The DP Computer System can be tested for a wide range of operational settings and environmental conditions, failures situations and operator commands in this test configuration. This is a very powerful testing method that is of great importance.

The main limitation of hardware-in-the-loop simulation is that only an isolated part of the DP system is tested, namely the DP computer system. It is also necessary to test the DP computer system as part of an integrated DP system, for testing the computer control systems within the thruster system, power management system, marine automation system etc. Another shortcoming of testing using hardware-in-the-loop simulation is that the quality of the test relies on the accuracy of the mathematical model used in the simulator, i.e. the fidelity of which the model resembles a real vessel with all its interacting components. For the vessel dynamics, hydrodynamics, measurement system, thrusters and rudders, the accuracy may be very good, and reliable results will be obtained from the results in a most test cases. However, the power system is very complicated in terms of number of input/output signals as well as very high-frequency dynamics and it cannot be expected that a mathematical model of sufficient accuracy will be practical for use in a hardware-in-the-loop simulator at the time of filing the present invention. On the background of the above, there is a need for an additional testing tool for DP systems.

FMEA Testing

It is an established practice that DP Systems are tested according to a Failure Mode and Effect Analysis (FMEA). In FMEA testing a number of critical failure modes of the DP Systems are identified, and it is tested how these failure modes are handled by the DP System. The testing is done by disabling and tripping equipment, and disconnecting and reconnecting cables and connectors of the DP System while the DP System is in its normal operation. Moreover, electronics boards may be removed and reinserted. Blackout tests are performed where parts of the power system is shut down.

The format of the testing of FMEA testing as described above can be said to be brute force, where failures are simulated "the hard way". It introduces problems related to risk for damage of cables, connectors, and electronics boards, and problems that may appear when a system is restarted after a black-out test. Moreover, such tests are time consuming. Also, it is a problem that some test cases that are desired cannot be performed as it may cause excessive costs, excessive time to complete, or risk to equipment or personnel.

Relation to Previous Patent Applications from Marine Cybernetics AS

Patent applications NO2002 6284, NO2003 5861, and PCT-NO 2003-000445 of Marine Cybernetics and Det Norske Veritas addressed a method and a system for remote testing of marine control systems.

The present invention is not based on hardware-in-the-loop simulation. Instead testing is performed with the DP system running in its normal operation by modifying the measurement signals or status signals from other computer systems such as the marine automation system, power management system or thruster control system The modification of the signals can be carried out locally within the thruster system, power system, sensor system etc., within the marine automation systems, or at the DP computer system interface. In this way the effect of sensor failures on the whole DP System can be checked. Such sensor failures may comprise signal loss, constant error, constant or varying signal offset, bad calibration of one or more sensors, sign errors, and the like.

Relation to Patent Application WO9214216 of Edge Electronics

Patent Application WO9214216 of Edge Electronics describes a system with the following elements in its main claims relevant for the present invention:

Claim 1:
An interactive diagnostic system for an automotive vehicle of the type having (1) a network of sensors and actuators for independently sensing and actuating a number of different functions within the vehicle, (ii) an onboard computer for monitoring said sensors and controlling the operation of said actuators, and (iii) means for electrically connecting said onboard computer with said sensors and actuators, said connecting means including an auto-side connector having a series of auto-side plug-in terminals respectively connected with said sensors and actuators and a computer-side connector disengagably connectable to said auto-side connector and having corresponding, complementary computer-side plug-in terminals connected to appropriate circuitry within the computer, said diagnostic system comprising:
(a) first means for selectively and temporarily disconnecting one or more of said auto-side terminals from corresponding computer-side terminals, whereby to selectively and temporarily disconnect one or more specific sensors and/or actuators from said computer;
(b) second means temporarily connectable with said one or more specific auto-side terminals when the latter are disconnected from their corresponding computer-side terminals for controlling the operation of said one or more specific actuators independent of said onboard computer; and
(c) third means temporarily connectable with said one or more specific computer-side terminals when the latter are disconnected from their corresponding auto-side terminals for simulating the operation of said one or more specific sensors independent of the actual operation of these latter sensors.

Claim 23:
A method of diagnosing an automotive vehicle of the type having (i) a network of sensors and actuators for independently sensing and actuating a number of different functions within the vehicle, (ii) an onboard computer for monitoring said sensors and controlling the operation of said actuators, and (iii) means for electrically connecting said onboard computer with said sensors and actuators, said connecting means including an auto-side connector having a series of auto-side plug-in terminals respectively connected with said sensors and actuators and a computer-side connector disengageably connectable to said auto-side connector and having corresponding, complementary computer-side plug-in terminals connected to appropriate circuitry within the computer, said method comprising the steps:
(a) selectively and temporarily disconnecting one or more of said auto-side terminals, in order to selectively and temporarily disconnect one or more specific sensors and/or actuators from said computer; and
(b) controlling the operation of said one or more specific disconnected actuators independent of said onboard computer and/or simulating the operation of said one or more specific disconnected sensors independent of the actual operation of those sensors.

According to the claims of Patent Application WO9214216 an actuator signal to a car-side actuator is either from the onboard computer, or it is from the second means independent of said onboard computer; in the same way a sensor signal that is input to the onboard computer is either from the car-side sensor, or it is from the third means independent of the actual operation of those sensors.

Moreover, it is noted that the diagnostic system described in Patent Application WO9214216 is designed for a vehicle where the sensors and actuators are connected to the vehicle computer with a network of individual signal lines, where each signal line connects the vehicle computer to one single sensor or actuator, and where selected signals are disconnected from the computer side or the vehicle side by unplugging a connector, and instead connecting said connector to the diagnostic system.

It can be concluded that Patent Application WO9214216
1. Does not account for the possibility of modifying one or more specific sensor or actuator signals by adding some additional signal component to each signal, or by scaling one or more of said signals with an offset and a gain for each said signal.
2. Does not allow for the possibility that one or more sensor signals and/or one or more actuator signals are used to calculate one or more modified sensor signals to be input to the onboard computer-side sensor signal terminals. Edge either uses or rejects single sensor signals.

The above mentioned restrictions, which are quite severe in the testing of DP systems, are not present in the present patent application.

SHORT SUMMARY OF THE INVENTION

The above mentioned problems may be overcome using an embodiment of the invention, being a test system for a marine vessel control system arranged for receiving real measurement signals from sensors and for output of control signals to actuators, comprising the following novel features:
a signal modifying computer arranged for being connected for receiving one or more of said real measurement signals,
said signal modifying computer being arranged for modifying said real measurement signals into modified measurement signals that depend on real values of said real measurement signals;
said signal modifying computer arranged for sending said modified measurement signals to said control system, said one or more modified measurement signal input replacing some or all of said real measurement signal input;

said control system arranged for acting upon said one or more modified measurement signals and remaining unaffected real measurement signals;

so as for enabling testing of said control system function on errors represented by said modified measurement signal imagined to occur in one or more sensors.

Further features of the invention are defined in the attached dependent claims.

The invention also includes a method for testing a marine vessel control system, said system receiving real measurement signals from sensors and providing control signals to actuators, connecting a signal modifying computer and receiving one or more of said real measurement signals, characterized in said signal modifying computer modifying said real measurement signals into modified measurement signals that depend on the real value of said real measurement signals;

said signal modifying computer sending said modified measurement signals to said control system, said one or more modified measurement signal input replacing some or all of said real measurement signal input;

said control system acting upon said one or more modified measurement signals and remaining unaffected real measurement signals;

for testing whether said control system acts in a desired way on errors represented by said modified measurement signal imagined to occur in one or more sensors. Further steps of the method according to the invention are included in the claims depending on the method claim.

SHORT FIGURE CAPTIONS

The invention is illustrated in the enclosed drawings which shall illustrate the invention only, and shall not be construed to limit the scope of the invention, which shall be limited by the attached claims only.

FIG. 1 illustrates prior art with a vessel 0 having sensors 8 sending sensor signals 7 to a control system 2 which also receives command control signals from a command console 10, said control system providing command signals to actuators like propellers 16, thrusters 17, and rudders 18.

Figure 2:
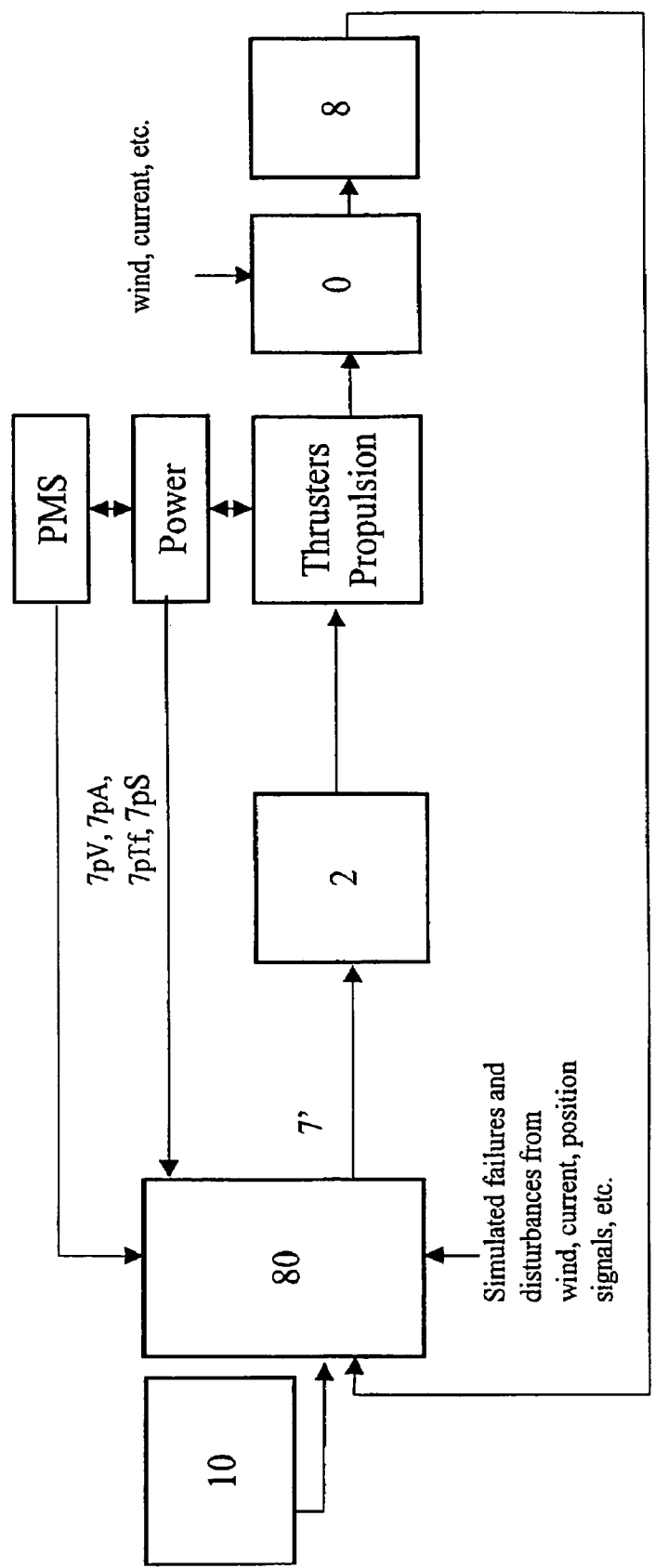

FIG. 2 illustrates a simplified illustration of a system according to one embodiment of the invention, in which a signal modification computer 80 is inserted before the control system 2. The command input console 10 is also illustrated. The signal lines may be multiple serial lines.

FIG. 3 illustrates a simplified illustration of a system according to an alternative embodiment the invention, using a computer communication network for sending sensor signals from the sensors to the signal modifier computer 80, and for sending the modified sensor signals to the control system 2, said control system providing control signals to actuators of the ship.

DESCRIPTION OF PREFERRED EMBODIMENTS ACCORDING TO THE INVENTIONS DP SYSTEM INTERFACES

A dynamic positioning system according to the invention may be designed with a number of different interface configurations. According to established practice, a DP System may be designed so that the DP Computer System is connected to a measurement network and an actuator network, where the measurement network and the actuator network are Ethernet networks, often designed as redundant networks. The measurement network and/or the actuator network may alternatively be replaced by a Fieldbus or CAN-bus communication that may be redundant, or by wireless communication systems. Some sensors may be connected directly to the DP Computer system with serial lines like RS232, RS422 or RS485, or by analog and digital signal lines.

The hardware interface to the DP system, with input/output boards including serial interfaces, digital-to-analog converters, analog-to-digital converters, digital interfaces, and signal conditioning may be integrated within the DP computer cabinet, or distributed on the vessel. Such distributed hardware interfaces may be located in dedicated interface electronic units or computers connected to a measurement network. Such hardware interfaces may also be integrated into the marine automation system computers or programmable logic computers (PLCs) on the vessel.

A First Preferred Embodiment of the Invention Using Serial Lines

Consider a DP System in which
1. the DP Computer System is connected to the position reference systems with serial lines like RS422, and where the remaining sensors of the measurement system is connected to the DP Computer System with Serial lines like RS422, or by analog signal lines.
2. the DP Computer System is connected to the thruster system through a computer network that will typically be a redundant or non-redundant Ethernet network running the UDP protocol, or by hardwired analog or digital signals;

In a first embodiment of the present invention an external Signal modifying computer is used for testing purposes. This Signal modifying computer is arranged for running a specially developed signal modifying algorithm. In testing, one or more of the serial lines from position reference systems and/or the other sensors of the measurement system are disconnected from the DP Computer System, and are instead connected to the Signal modifying computer. Each of the said serial lines is replaced by a serial line from the Signal modifying computer to the DP Computer System, so that the sensor signal input to the DP Computer System is a signal that is generated, i.e. modified in the Signal modifying computer.

The signal modifying computer is not a signal simulator. The signal modifying computer receives one or more sensor signals that in normal operation would be input to the DP Computer System. The Signal modifying computer calculates for testing purposes new values for said sensor signals based on the signals of one or more of the sensor signal that are input to the Signal modifying computer. The said new values for the sensor signals are transmitted with minimum internal delay to the DP Computer System over the serial lines from the Signal modifying computer to the DP Computer System.

The DP System may then be tested as follows:
1. The DP Computer System, the Power System, the Measurement System, the Thruster System and the Operator Station of the DP System are run in their normal operative mode.
2. The Signal modifying computer continuously receives one or more sensor signals from the Measurement System, generates one or more modified sensor signals corresponding to said one or more of the sensor signals, where said modified sensor signals are computed in the Signal modifying computer with an algorithm that depend on the true value of said sensor signals, the Signal modifying computer outputs said one or more modified sensor signals to the DP Computer System.

A Second Preferred Embodiment of the Invention Using a Computer Network

The invention may be represented by a test system for a marine vessel control system (2) arranged for receiving real measurement signals (7) from sensors (8) and for output of control signals (13) to actuators (16, 17, 18).

A signal modifying computer (80) is arranged for being connected for receiving one or more of said real measurement signals (7).

The signal modifying computer (80) is arranged for modifying the real measurement signals (7), preferably in a relatively short time, into modified measurement signals (70). The modification of the real measurement signals is not random, but takes place based on real values of said real measurement signals. As an example, position signals from one of two or more GPS sensors, said position signals comprising longitude and latitude, may be modified by a constant or varying vector, said vector having a length and direction, e.g. A length of 75 m and a direction of 30 degrees to the NNE., representing an offset error in a GPS reading, giving an error of 75 m cos 30 to the north, and 75 m sin 30 to the east.

The signal modifying computer (80) is arranged for sending the modified measurement signals (70) to the above-mentioned control system (2), of which one or more of said modified measurement signal (70) input replace some or all of said real measurement signal (8) input.

said control system (2) arranged for acting upon said one or more modified measurement signals (70) and remaining unaffected real measurement signals (7);

The purpose of the invention is for enabling testing of said control system (2) function on such errors represented by said modified measurement signal (70) imagined to occur in one or more sensors (8). As an introductory example, the test may reveal if the system is capable of discriminating between e.g. suddenly changing or unstable readings of one sensor, e.g a first GPS sensor, and less varying or stable readings of a similar sensor, e.g another GPS sensor. The test may also reveal if the system is capable of discriminating e.g. a high-priority position signal like a highly precise dGPS signal that by some error occuring becomes really untrustworhy, and giving priority to an otherwise less precise position signal coming from e.g. a hydroacoustic transponder, but still reliable with respect to the test situation. Such a behaviour would be desirable in a real situation in which the transponder system continues to function while one or both the dGPS systems should malfunction.

With reference to the drawings, in the test system according to the invention, the marine control system (2) is arranged for receiving input command signals (9) from a command input device (10) on a command signal line (11). Further, in the test system said sensors (8) are connected to said control system using a sensor signal line (12).

Consider a DP System where
 a) the DP Computer System is connected to the measurement system with a computer network that will typically be (i) a redundant or non-redundant Ethernet network running the UDP protocol, (ii) a redundant or non-redundant Fieldbus or CAN-bus, or (iii) a wireless signal transmission protocol;
 b) the DP Computer System is connected to the actuators through a computer network In a second embodiment of the present invention an external Signal modifying computer is used for testing purposes. This Signal modifying computer is arranged for running a specially developed signal modification algorithm. In testing, the Signal modifying computer is connected to a computer network that connects the DP Computer System to the Measurement System. The signal modifying computer inputs one or more sensor signals from the Measurement System, and based on these input sensor signals and a computer algorithm, the Signal modifying computer calculates modified values for said sensor signals, and the Signal modifying computer outputs the modified sensor signals on the computer network, the modified signals having the DP computer as their destination.

For testing purposes, the input of the DP Computer System may be changed by changing the list of input signals to the DP Computer System so that the DP Computer System receives the said modified sensor signals from the Signal modifying computer instead of the corresponding sensor signals that are transmitted from the Measurement System.

The DP System may then be tested as follows:
1. The Power System, the Measurement System, the Thruster System and the Operator Station of the DP System are run in their normal operative mode.
2. The DP Computer System is set up to read one or more modified signals from the signal modifying computer instead of the corresponding sensor signals from the Measurement System.
3. The Signal modifying computer continuously receives one or more sensor signals from the Measurement System via the computer network, generates one or more modified sensor signals corresponding to said one or more of the sensor signals, where said modified sensor signals are computed in the Signal modifying computer with an algorithm that depend on the true value of said sensor signals, the Signal modifying computer outputs said one or more modified sensor signals to the DP Computer System via the computer network.

With reference to the drawings, the test system according to the invention is arranged for outputting control signals (13) to said actuators (16, 17, 18), like propellers (16), thrusters (17), and rudders (18).

Further, the signal modifying computer (80) is arranged for modifying said real measurement signals (7) in a relatively short time into modified measurement signals (70), so as for said control system (2) experiencing no significant delay of said modified measurement signals (70) as compared to the corresponding reception time said control system (2) would have received said real measurement signals (7).

The test system according to the invention, said control system (2) may comprise a power management system including power sensors (8p?) for sensing power signals like generator output voltage (7pV), generator output current (7pA), generator power (7pP), fractional total generator power (7pTf), generator status (7pS), and the like.

APPLICATIONS OF THE INVENTION

Position Reference System Test Arrangement

In a DP System the position of the vessel is determined on the basis of measurement in one or more position reference systems. A position reference system outputs (i) the position of a reference point that is fixed in the vessel or (ii) the heading of the vessel. A position reference system may be one of the following:
a) A DGPS Position Reference System in which a differential GPS systems (DGPS) that measures the position of the GPS antennae in combination with a gyrocompass that measures the vessel course, and a vertical reference unit that establishes the direction of the vertical line. Other satellite navigation systems, like Galileo, or land-based navigation systems may be used. From these measurements the DP Computer System can calculate the position of the vessel reference point can be calculated by adjusting the position of the GPS antennae for the distance between the GPS antennae and the vessel reference point for the measured heading and the measured direction of the vertical.

b) A hydroacoustic position reference system where a hydroacoustic measurement system gives the position of the hydroacoustic transponder in combination with a gyrocompass that measures the vessel course, and a vertical reference unit that establishes the direction of the vertical line. From these measurements the DP Computer System can calculate the position of the vessel reference point by adjusting the position of the hydroacoustic transponder for the distance between the hydroacoustic transponder and the vessel reference point for the measured course and the measured direction of the vertical.

c) Tautwire, Fanbeam, DARPS, ARTEMIS, Gyro compass etc.

A correctly operating position reference system is critical for the safe and effective performance of the DP System. Because of this it is common practice in safety-critical operations involving DP Systems to use at least three position reference systems. One typical configuration is to use to DGPS position reference systems, and one hydroacoustic position reference system. The motivation for this is that it is hoped that a failure in one of the position reference systems can be compensated for or eliminated by using information from the two remaining position reference systems. In several recorded incidents it has been experienced that even with three position reference systems it may occur that the DP System cannot establish the correct position when one of the reference systems has a failure. On background of this it important to test how and to what extent the DP System handles malfunction of, or failure in, one or more position reference systems.

The Signal modifying computer of the present invention is a new and useful tool in the testing of DP System performance if failures occur in the position reference systems. Such tests may be conducted as follows using the first preferred embodiment of the invention. In the description it is assumed that the DP system has two DGPS systems and one hydroacoustic position reference system with transponders on the sea-floor, and that each of the three position reference systems are connected to the DP Computer System with an RS232 serial line.

1. The DP Computer System, the Power System, the Measurement System, the Actuator System and the Operator Station of the DP System are run in their normal operative mode.
2. The RS232 serial lines of preferably each of the three position reference systems are disconnected from the DP Computer System, and are instead connected to the Signal modifying computer. Said RS232 serial lines connected to the DP Computer System are replaced by RS232 serial lines from the Signal modifying computer to the DP Computer System.
3. The position reference signals from the three position reference sensors are input to the Signal modifying computer. Each of the position reference signals will include the position of a point on the vessel, the course angle, and the direction of the vertical line.
4. The Signal modifying computer calculates modified position reference signals that would result for a given failure situation and transmits the modified position reference signals to the DP Computer System.
5. The performance of the DP System represented by the output and other status signals for the failure situation in the test is recorded by logging sensor signals input to the DP Computer System, and actuator signals output from the DP Computer System, and possibly status signals.

To further explain how position reference tests are performed, the following three examples are presented in the following:

Position Reference Test 1—Reduced GPS Signal Quality

Position reference test 1 is a test where the Signal modifying computer is used to test the performance of a DP System with respect to a failure in the form of reduced quality of the signal from one of the GPS satellites. This is an external error that may incur the same erroneous position if both GPS receivers receive signals from the same set of satellites. Such failure situations are known to occur, and in recorded incidents such failure have cause DP systems to have a drive-off, which is a potentially safety threatening incident where the DP System uses the thrusters so that the vessel is driven away from its assigned position in an uncontrolled action. The DP System under consideration is assumed to have two DGPS position reference system and one hydroacoustic position reference system.

As explained above, the position reference systems are connected to the Signal modifying computer instead of the DP Computer System, and the Signal modifying computer sends modified position reference signals to the DP Computer System.

Then based on the measured antennae position from the two DGPS position reference systems in combination with the known GPS satellite configuration at the time of the test, one satellite is selected for test purposes as having a failure condition leading to reduced quality GPS signal. Then, it is calculated what the change in the measured GPS antennae would be for the two DGPS position reference systems with the reduced quality GPS signal for the said satellite. The Signal modifying computer then adjusts the position reference signals to account for the said change in antennae position of the DGPS position reference systems, and sends the modified position reference signals to the DP Computer System. In this way it is tested how the DP System handles inaccurate GPS satellite signals.

Position Reference Test 2—Predetermined Position Change Rate Signal Discrimination An established method which is based on textbook practices in control theory is to monitor the rate of variation in a sensor signal, and then to discard the sensor signal as invalid if the variations in the sensor signal are larger that what can be physically realized. The method is used in DP System to eliminate failures in position reference systems. In a recorded incident two DGPS position reference systems in a DP System showed an instantaneous change in the measured position of 75 meters due to an error in the GPS satellite signal. Obviously, a vessel cannot instantaneously change its position by 75 meters, and because of this the signals from the two DGPS position reference were appropriately discarded as invalid by the DGPS System.

It turns out, however, that this method is not without problems. In another recorded incidence from offshore Angola, a sudden impact from a series of large waves moved a vessel very quickly 25 meters away from its initial position. The DGPS position reference systems recoded this quick change in motion correctly, but the DP System discarded the perfectly sound DGPS position reference signals because the rate of change in position was larger than the threshold value that the DP System was set to accept. As a result of this the vessel was left with all position reference systems deactivated by the DP System.

To test how the DP System handles such situations, it is proposed to use the Signal modifying computer of the present invention. The position reference signals are input to the Signal modifying computer instead of being input to the DP Computer Systems as explained above. The position reference signals are used to calculate the position of the vessel reference point. The Signal modifying computer then adds a position increment to the vessel reference point corresponding to some pre-specified quick motion that may correspond to the motion imposed from a sudden impact of a series of large waves. the Signal modifying computer continuously modifies the position reference signals so that these signals correspond to the modified motion of the vessel reference point. These modified position reference signals are continuously sent to the DP Control System, and it can be observed if the DP System can handle a given wave excitation without discarding the position reference systems.

Position Reference Test 3—Hydroacoustic Errors

Hydroacoustic position reference systems are use in combination with DGPS position reference systems in DP systems. The performance of the hydroacoustic position reference system is important especially if there are problems with the DGPS position reference systems.

Recorded failure situations for hydroacoustic position reference systems in DP operations can be efficiently used for testing the control system using the Signal modifying computer. To do this, hydroacoustic position reference signals are input to the Signal modifying computer. Then these signals are modified in a computation in the Signal modifying computer where the following tests are performed
a) The effect of noise with changing variance on the hydroacoustic position reference signals is studied by adding a noise signal to the position signal from the hydroacoustic position reference and sending the modified signal to the DP Computer System. This test can be extended to studying the combined effect of noise on both hydroacoustic and DGPS position reference systems by also adding noise signals to the DGPS position reference signals.
b) The effect on the DP System of acoustic communication errors due to reflections of hydroacoustic signals, poor communication between transponders on the sea-floor, transponder failure, or transponder outage can be tested by modifying the hydroacoustic position reference signals using mathematical models of hydroacoustic signal transmission and the resulting change in the position signals.
c) The effect of a reduced sample rate of the acoustic data is tested by modifying the signals from the hydroacoustic position reference so that the sample rate is reduced from e.g. 1 Hz to e.g. 0.5 Hz.

Position Reference Test 4—Vertical Reference Errors

A vertical reference unit is used in a DP System as input to the position reference signals to compute the position of the vessel reference point. Failure in the vertical reference unit will give wrong values in the calculation of the position of the vessel reference point, and if the error in the vertical reference unit is more than 90 degrees, then the calculation may even break down due to possible division by zero in the algorithm depending on the implementation of the computations.

The effect of a failure in the position reference system is done by modifying the vertical reference system signals in the Signal modifying computer, and sending the modified signals to the DP Computer System, to test the control system's tolerance to such errors in vertical reference unit measurements Wind Sensor Test A DP System will normally have one or more wind sensors that measure the speed of the wind acting on the vessel. Then according to techniques known from textbooks in marine engineering it is possible to calculate the forces and torques on the vessel due to the wind. It is then possible to use these calculations in the algorithm of the DP Computer to achieve improved accuracy in the DP system when the wind is strong. It is foreseen that a wind sensor may become defect, or it may show an incorrect value due to a failure, or because a helicopter is hovering close to the wind sensor.

To test how the DP System handles a failure in one of the wind sensors the Signal modifying computer can be used as follows: The wind sensor signal line, which may be an analog signal line, or a digital RS232 serial line, is disconnected from the DP Computer System, and the signal is instead connected to the Signal modifying computer. The wind sensor signal line is replaced by another signal line of the same type that is connected to the DP Computer System, so that this signal line transmits a modified wind sensor signal from the Signal modifying computer to the DP Computer System. Then the Signal modifying computer modifies the wind sensor signal according to one of the following alternatives:

Adding a signal with high noise variance for a defined time interval.

Adding a drift signal so that the modified signal diverges from the sensor signal for a defined time interval.

Adding a constant signal bias for a defined time interval

Applying a signal freeze so that the modified signal is a constant value for a defined time interval.

The modified wind sensor signal is sent to the DP Computer System instead of the wind sensor signal.

Blackout Prevention Test of the Power Management System

Thrusters and propellers driven by diesel-electric systems are widely used in ships and floating oil installations. In these systems diesel engines are used to drive electrical generators that supply electrical power to an electrical power system on the vessel. The thrusters and propellers are driven by electrical motors that are powered from the electrical power system. In addition the electrical power system is used to drive other functions of the vessel like cranes, heave compesation, drilling, refrigeration, and air-conditioning. A well-known problem in this type of systems is that if the electrical power that is used by the other functions of the vessel is high, then the power that is available to the thrusters and the propellers may be insufficient compared to what is required to achieve the thrust that is commanded by the DP System. The same is the case for manually controlled vessels where the operator may require thrust corresponding to an electrical power consumption that exceeds the power that is available. In cases of which the available electrical power is insufficient, a power management system, which is a control system integrated in the power system, reduce the power that is distributed to the different systems that consume electrical power, and it may even shut down such consumers.

If the lack of available power for propulsion is not appropriately handled by the power management system, then there is a risk that the vessel may experience a partial power outage where one or more of the switchboards and power buses are shut down, an it may even occur that the vessel will have a blackout where there is a complete loss of electrical power on the vessel, which is a situation that may lead to accidents and loss of vessel.

On the background of the above it is understood that it is important that the function of the power management system is extensively tested in combination with all the installed units of the vessel, and in particular in combination with the DP System.

a) Consider a vessel with a DP system, of which signals indicating the power delivered by the electrical generators are sent to the DP Computer System under normal operation, and the DP System is designed to appropriately reduce the power consumption of the thrusters if the electrical power consumed by other functions of the vessel is high. The power reduction function of the DP System can be tested with the DP System in its normal operation at sea, with the exception that the power indicating signals from the generators to the DP System are modified by the Signal modifying computer so that the modified signals indicate that the power from the generators to other functions of the ship is e.g 90% of the available power. It can then be tested if the DP System is capable of handling such a situation satisfactorily.

b) Consider another vessel with a DP system, of which signals indicating the power delivered by the electrical generators are sent to the power management system and not to the DP Computer System under normal operation, and the power management system, and not the DP System, is designed to appropriately reduce the power consumption of the thrusters if the electrical power consumed by other functions of the vessel is high. The power reduction function of the power management system can then be tested with the DP System in its normal operation at sea, with the exception that the power indicating signals from the generators to the power management system are modified by the Signal modifying computer so that the modified signals indicate that the power from the generators to other functions of the ship is near the total power capacity, e.g 90% of the available power. It can then be tested if the power management system handles this situation satisfactorily in combination with the DP System.

Propulsion System Test

Propulsion systems are critical factors in DP vessels. The interaction between the control system of a thruster, the power management system and the DP Systems can cause problems, and it is important to test these systems in combination. A propulsion system in this connection comprises a propeller, the electrical thruster motor driving the propeller, the drive controlling the pitch of the propeller blades, the drive controlling the azimuth angle in the case of an azimuth thruster, and the thruster control system that measures that shaft speed and shaft power of the propeller and controls the thruster motor so that it achieves the commanded shaft speed of shaft power.

In a propulsion system test it is of interest to test the system when there is an error in one or more of the thruster pitch signal, RPM or power signal feedback signal, or thruster status signals. This is done by running the system in its normal operation except that one or more thruster signals is modified by the Signal modifying computer.

The invention claimed is:

1. A test system for a marine vessel dynamic positioning system, wherein said dynamic positioning system comprises actuators (16, 17, 18), sensors (8), and a control system (2), said control system arranged for receiving real measurement signals (7) from sensors (8) and for output of control signals (13) to said actuators (16, 17, 18), said test system comprising a signal modifying computer (80) arranged for:
    receiving one or more of said real measurement signals (7),
    modifying said one or more real measurement signals (7) into modified measurement signals (70) that depend on real values of said real measurement signals;
    sending said modified measurement signals (70) to said control system (2), wherein said modified measurement signal (70) replaces one or more of said real measurement signals(7);
    said control system (2) arranged for acting upon said one or more modified measurement signals (70) and remaining unaffected real measurement signals (7);
    wherein said signal modifying computer enables testing of said control system (2) function on errors represented by said modified measurement signals (70) imagined to occur in one or more sensors (8).

2. The test system of claim 1, said marine control system (2) arranged for receiving input command signals (9) from a command input device (10) on a command signal line (11).

3. The test system of claim 1, said sensors (8) connected to said control system using a sensor signal line (12).

4. The test system of claim 3, said sensor signal line (12) comprising an analog line, a serial line, or a digital Ethernet line, a fieldbus or CAN-bus, or a local radio communication system.

5. The test system of claim 1, arranged for outputting control signals (13) to said actuators (16, 17, 18), like propellers (16), thrusters (17), and rudders (18).

6. The test system of claim 1, said signal modifying computer (80) being arranged for modifying said real measurement signals (7) in a relatively short time into modified measurement signals (70), so as for said control system (2) experiencing no significant delay of said modified measurement signals (70) as compared to the corresponding reception time said control system (2) would have received said real measurement signals (7).

7. The test system of claim 1, said control system (2) comprising a power management system including power sensors (8p) for sensing power signals like generator output voltage (7pV), generator output current (7pA), generator power (7pP), fractional total generator power (7pTf), generator status (7pS), and the like.

8. The test system of claim 1, said marine control system (2) arranged for receiving input command signals (9) from a command input device (10) on a command signal line (11).

9. A method for testing a marine vessel dynamic positioning system, wherein said dynamic positioning system comprises actuators (16, 17, 18), sensors (8), and a control system (2), said control system (2) receiving real measurement signals (7) from said sensors (8) and providing control signals (13) to said actuators (16, 17, 18), said method comprising the following steps:
    connecting a signal modifying computer (80) for receiving one or more of said real measurement signals (7),
    modifying said real measurement signals (7) into modified measurement signals (70) that depend on the real value of said real measurement signals (7) in said signal modifying computer (80);
    sending said modified measurement signals (70) to said control system (2), wherein said one or more modified measurement signals (70) replaces one or more of said real measurement signals (7);
    wherein said control system (2) acts upon said one or more modified measurement signals (70) and remaining unaffected real measurement signals (7); for testing said control system (2) on errors represented by said modified measurement signal (70) imagined to occur in one or more sensors (8).

10. The method according to claim 9, said control system sending control signals (13) to said actuators (16, 17, 18) like propellers (16), thrusters (17), and rudders (18).

11. The method according to claim 9, said signal modifying computer (80) modifying said real measurement signals (7) in a relatively short time into modified measurement signals 1(70), so as for said control system (2) experiencing no significant delay of said modified measurement signals (70) as compared to the corresponding reception time said control system (2) would have received said real measurement signals (7).

12. The method of claim 9, said signal modifying computer (80) modifying one or more of said real measurement signals (7) into one or more modified measurement signals (70) that depend on the real value of said one or more real measurement signals (7), said modified measurement signals (70) being functions of said one or more real values of said measurement signals (7), said functions comprising adding constant or varying values to said real measurement signals (7), multiplying said real measurement signals (7) by constant or varying values, or using linear function depending on said real measurement signal to modify said real measurement signals (7).

13. The method according to claim 9, connecting one or more of said sensors (8) to said control system using one or more of sensor signal lines (12), and connecting said sensor simulator (80) on said sensor signal line (12) for receiving said one or more real sensor signals (8), and modifying said one or more real sensor signals in said sensor simulator (80) into said one or more modified sensor signals (70), and sending said one or more modified sensor signals (70) along said sensor signal lines (12) from said sensor simulator (80) to said control system (2).

14. The method according to claim 9, using one or more serial lines for said sensor signal lines (12), e.g. RS232, RS422.

15. The method according to claim 9, using one or more computer network bus lines like a redundant or non-redundant Ethernet network on UDP protocol, a Fieldbus or CAN-bus, or a radio signal transmission system.

16. The method according to claim 9, using one or more Ethernet communication lines, a fieldbus or CAN-bus, or a local radio communication system.

* * * * *